US012738543B2

(12) United States Patent
Zhang et al.

(10) Patent No.: US 12,738,543 B2
(45) Date of Patent: Sep. 15, 2026

(54) ELECTROCHEMICAL DEVICE AND ELECTRONIC DEVICE

(71) Applicant: Dongguan Amperex Technology Limited, Dongguan City (CN)

(72) Inventors: Lilan Zhang, Dongguan City (CN); Hui Cui, Dongguan City (CN); Chao Tang, Dongguan City (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 916 days.

(21) Appl. No.: 17/957,344

(22) Filed: Sep. 30, 2022

(65) Prior Publication Data

US 2023/0107992 A1 Apr. 6, 2023

(30) Foreign Application Priority Data

Sep. 30, 2021 (CN) ......................... 202111164685.X

(51) Int. Cl.

| | |
|---|---|
| ***H01M 10/0569*** | (2010.01) |
| ***H01M 4/02*** | (2006.01) |
| ***H01M 4/38*** | (2006.01) |
| ***H01M 4/587*** | (2010.01) |
| ***H01M 10/0525*** | (2010.01) |

(52) U.S. Cl.

CPC ....... *H01M 10/0569* (2013.01); *H01M 4/386* (2013.01); *H01M 4/587* (2013.01); *H01M 10/0525* (2013.01); *H01M 2004/021* (2013.01); *H01M 2004/027* (2013.01); *H01M 2300/0034* (2013.01)

(58) Field of Classification Search

CPC ............. H01M 10/0569; H01M 4/587; H01M 10/0525; H01M 2004/021; H01M 4/02; H01M 2300/0034

See application file for complete search history.

(56) References Cited

U.S. PATENT DOCUMENTS

| | | | | |
|---|---|---|---|---|
| 9,979,002 | B2 | 5/2018 | Kim et al. | |
| 10,644,353 | B2 | 5/2020 | Matsuoka et al. | |
| 12,191,442 | B2 | 1/2025 | Wang | |
| 2007/0292756 | A1 | 12/2007 | Tsuchiya | |
| 2009/0286155 | A1* | 11/2009 | Takehara | H01M 10/0569 429/199 |
| 2013/0266847 | A1 | 10/2013 | Noguchi et al. | |
| 2013/0330635 | A1* | 12/2013 | Shishikura | H01M 10/0567 429/200 |
| 2015/0010831 | A1 | 1/2015 | Noguchi et al. | |
| 2017/0104238 | A1* | 4/2017 | Abe | H01M 4/525 |
| 2017/0162910 | A1 | 6/2017 | Katou et al. | |
| 2020/0303767 | A1 | 9/2020 | Wang | |
| 2020/0328409 | A1* | 10/2020 | Ito | H01M 4/131 |
| 2021/0328267 | A1* | 10/2021 | Harada | H01M 10/0569 |
| 2022/0149431 | A1* | 5/2022 | Wenqiang | H01M 4/62 |
| 2023/0080975 | A1* | 3/2023 | Mori | H01M 4/622 429/332 |
| 2023/0290998 | A1 | 9/2023 | Wang | |
| 2025/0079498 | A1 | 3/2025 | Wang | |
| 2025/0087739 | A1 | 3/2025 | Wang | |

FOREIGN PATENT DOCUMENTS

| | | | |
|---|---|---|---|
| CN | 104370744 | A | 2/2015 |
| CN | 104934638 | A | 9/2015 |
| CN | 105720303 | A | 6/2016 |
| CN | 109273767 | A | 1/2019 |
| CN | 111933946 | A | 11/2020 |
| CN | 113161609 | A | 7/2021 |
| JP | 2019200855 | A | 11/2019 |

OTHER PUBLICATIONS

Notice of Allowance mailed Feb. 9, 2024, in Chinese Application No. 202111164685.X, 5 pages.

Supplementary European Search Report mailed Feb. 9, 2023, in European Application No. 22199179.7, 3 pages.

* cited by examiner

*Primary Examiner* — Nicholas A Smith

(74) *Attorney, Agent, or Firm* — XSENSUS LLP

(57) ABSTRACT

An electrochemical device includes a negative electrode plate and an electrolyte. The negative electrode plate includes a negative active material. A specific surface area of the negative active material is A $m^2/g$ and $0.3 \leq A \leq 4$. The electrolyte includes fluorocarboxylate and fluorocarbonate. Based on a mass of the electrolyte, a mass percent of the fluorocarboxylate is X % and a mass percent of the fluorocarbonate is Y %, $5 \leq Y \leq 70$, and the electrochemical device satisfies $50 \leq X+Y \leq 85$, and $6 \leq Y/A \leq 200$. The synergy between the negative active material and the electrolyte can effectively improve cycle performance of the electrochemical device under high voltages, and alleviate lithium plating of the negative electrode.

20 Claims, No Drawings

ELECTROCHEMICAL DEVICE AND ELECTRONIC DEVICE

CROSS REFERENCE TO RELATED APPLICATIONS

The present application claims priority to Chinese Patent application no. CN 202111164685.X filed in the China National Intellectual Property Administration on Sep. 30, 2021, the entire content of which is hereby incorporated by reference.

TECHNICAL FIELD

This application relates to the technical field of electrochemistry, and in particular, to an electrochemical device and an electronic device.

BACKGROUND

By virtue of the advantages of a high energy storage density, a high open circuit voltage, a low self-discharge rate, a long cycle life, and high safety, lithium-ion batteries are widely used in various fields such as portable electric energy storage, electronic devices, and electric vehicles. However, this imposes higher requirements on comprehensive performance of the lithium-ion batteries, such as high cycle performance at high voltages (for example, a voltage higher than 4.2 V).

In the related art, the cycle performance of a battery under high voltages is mostly enhanced by improving an electrolyte, for example, by fluorinating a solvent in the electrolyte to improve oxidation resistance of the solvent in a positive electrode and reduce side reactions in the positive electrode. However, after the solvent is fluorinated, although the oxidation resistance is higher, reduction resistance in a negative electrode is correspondingly lower, resulting in an increase in side reactions in the negative electrode. Especially, when a mass percent of the fluorinated solvent in the electrolyte is relatively high (for example, higher than 50%), the fluorination brings new problems of a negative electrode interface, and aggravates the side reactions in the negative electrode, thereby deteriorating cycle performance of the battery under high voltages.

SUMMARY

An objective of this application is to provide an electrochemical device and an electronic device to improve cycle performance of the electrochemical device under high voltages.

A first aspect of this application provides an electrochemical device, including a negative electrode plate and an electrolyte. The negative electrode plate includes a negative active material. A specific surface area of the negative active material is A $m^2/g$ and $0.3 \le A \le 4$, and preferably $0.5 \le A \le 2$. The electrolyte includes fluorocarboxylate and fluorocarbonate. Based on a mass of the electrolyte, a mass percent of the fluorocarboxylate is X % and a mass percent of the fluorocarbonate is Y %, $5 \le Y \le 70$, and preferably $10 \le Y \le 40$. The electrochemical device satisfies $50 \le X+Y \le 85$, and $6 \le Y/A \le 200$, and preferably $15 \le Y/A \le 150$. Without being limited to any theory, when the electrolyte includes a fluorinated solvent fluorocarbonate and fluorocarboxylate at a high mass weight, and the mass percent of fluorocarbonate and fluorocarboxylate satisfies the foregoing relationships, the specific surface area of the negative active material is 0.3 $m^2/g$ to 4 $m^2/g$. In this way, the synergy between the negative active material and the electrolyte can effectively improve the cycle performance such as a capacity retention rate of the electrochemical device under high voltages. In this application, the high mass percent of the fluorinated solvent may mean that the mass percent of the fluorinated solvent is greater than or equal to 50%, or mean that the mass percent of the fluorinated solvent is greater than or equal to 60%.

For example, the specific surface area of the negative active material may be 0.3 $m^2/g$, 0.5 $m^2/g$, 1 $m^2/g$, 1.5 $m^2/g$, 2 $m^2/g$, 2.5 $m^2/g$, 3 $m^2/g$, 3.5 $m^2/g$, 4 $m^2/g$, or a value falling within a range formed by any two thereof. Without being limited to any theory, when the specific surface area of the negative active material is deficient (for example, less than 0.3 $m^2/g$), the particle size of the negative active material is relatively large, thereby impairing kinetic performance of the negative active material, hindering transport of lithium ions, and deteriorating the kinetic performance such as cycle performance and rate performance of the electrochemical device. When the specific surface area of the negative active material is excessive (for example, greater than 4 $m^2/g$), the negative active material is more active, and is prone to side reactions with the electrolyte, thereby deteriorating the cycle performance of the electrochemical device. Setting the specific surface area of the negative active material to fall within the foregoing range helps to improve the cycle performance of the electrochemical device.

For example, the mass percent of the fluorocarbonate may be 5%, 10%, 20%, 30%, 40%, 50%, 60%, 70%, or any value falling within a range formed by any two thereof. Without being limited to any theory, when the mass percent of the fluorocarbonate is deficient (for example, less than 5%), the mass percent not only deteriorates the low-temperature performance of the electrochemical device, but also causes inconvenience to the formation of a stable solid electrolyte interface (SEI), and impairs the cycle performance of electrochemical device under high voltages. The increase of the mass percent of the fluorocarbonate helps to form a stable SEI and improves the cycle performance of the electrochemical device. When the mass percent of the fluorocarbonate is excessive (for example, higher than 70%), the mass percent of the fluorocarboxylate becomes deficient, thereby impairing the high-temperature storage performance of the electrochemical device. Setting the mass percent of the fluorocarbonate to fall within the foregoing range helps to improve the low-temperature performance, high-temperature storage performance, and cycle performance of the electrochemical device.

For example, the value of X+Y may be 50, 55, 60, 65, 70, 75, 80, 85, or any value falling within a range formed by any two thereof. Without being limited to any theory, setting the value of X+Y to fall within the foregoing range, that is, setting the total mass percent of the fluorocarboxylate and fluorocarbonate to fall within the foregoing range, helps to improve the cycle performance of the electrochemical device under high voltages and alleviate the lithium plating of the negative electrode. The positive electrode according to this application may mean a positive electrode plate, and the negative electrode may mean a negative electrode plate.

For example, the value of Y/A may be 6, 10, 30, 50, 80, 100, 130, 150, 180, 200, or any value falling within a range formed by any two thereof. Without being limited to any theory, when the electrolyte of the electrochemical device includes a fluorinated solvent at a high mass percent, setting the value of Y/A to fall within the foregoing range further helps to achieve synergy between the negative active material and the electrolyte, thereby improving the cycle performance of electrochemical device under high voltages.

In some embodiments of this application, the fluorocarboxylate includes at least one selected from the group consisting of ethyl difluoroacetate, difluoroethyl acetate, ethyl monofluoroacetate, monofluoroethyl acetate, ethyl trifluoroacetate, and trifluoroethyl acetate. Without being limited to any theory, the use of the foregoing fluorocarboxylate helps to improve the high-temperature storage performance and high-voltage cycle performance of the electrochemical device.

In some embodiments of this application, the number of carbon atoms in the fluorocarbonate is less than or equal to 7, and the fluorocarbonate includes cyclic fluorocarbonate and/or chain fluorocarbonate. For example, the number of carbon atoms in the fluorocarbonate may be 1, 2, 3, 4, 5, 6, 7, or any value falling within a range formed by any two thereof. Without being limited to any theory, when the number of carbon atoms in the fluorocarbonate is excessive (for example, greater than 7), the viscosity of the electrolyte increases, thereby being adverse to the transport of lithium ions, and impairing the rate performance of the electrochemical device. Setting the number of carbon atoms in the fluorocarbonate to fall within the foregoing range helps to improve the rate performance of the electrochemical device. In addition, the fluorocarbonate includes cyclic fluorocarbonate and/or chain fluorocarbonate, thereby helping to improve the low-temperature performance of the electrochemical device. The number of carbon atoms in the fluorocarbonate is a positive integer.

In some embodiments of this application, the fluorocarbonate includes fluoroethylene carbonate and/or difluoroethylene carbonate. The fluorocarbonate is cyclic fluorocarbonate. Without being limited to any theory, the use of the foregoing fluorocarbonate helps to improve the cycle performance of the electrochemical device under high voltages.

In some embodiments of this application, the fluorocarbonate includes at least one selected from the group consisting of bis(2,2,2-trifluoroethyl)carbonate, bis(2,2-difluoroethyl)carbonate, methyl trifluoroethyl carbonate, methyl difluoroethyl carbonate, and methyl-fluoroethyl carbonate. The fluorocarbonate is chain fluorocarbonate. Without being limited to any theory, the use of the foregoing fluorocarbonate helps to improve the cycle performance of the electrochemical device under high voltages.

In some embodiments of this application, the electrolyte may further include a nitrile compound. The number of cyano groups in the nitrile compound is 1 to 6. Based on the mass of the electrolyte, the mass percent of the nitrile compound is Z %, and satisfies $0.1 \le Z \le 10$ and $0.5 \le Y/Z \le 120$, and preferably, $0.3 \le Z \le 8$, and $5 \le Y/Z \le 120$. Without being limited to any theory, when the electrolyte contains a nitrile compound added in specified content relationships, the electrolyte helps to improve the cycle performance of the electrochemical device and alleviate the lithium plating of the negative electrode.

For example, the number of cyano groups in the nitrile compound may be 1, 2, 3, 4, 5, 6, or any value falling within a range formed by any two thereof. Without being limited to any theory, setting the number of cyano groups in nitrile compound to fall within the foregoing range helps to improve the cycle performance of the electrochemical device. The number of cyano groups is a positive integer.

For example, the mass percent of the nitrile compound may be 0.1%, 0.5%, 1%, 2%, 3%, 4%, 5%, 6%, 7%, 8%, 9%, 10%, or any value falling within a range formed by any two thereof. Without being limited to any theory, when the mass percent of the nitrile compound is deficient (for example, lower than 0.1%), the effect of improving the performance of the electrochemical device is insignificant. When the mass percent of the nitrile compound is excessive (for example, higher than 10%), the mass percent of the fluorocarbonate and fluorocarboxylate decreases, thereby impairing the cycle performance of the electrochemical device, and aggravating the lithium plating of the negative electrode. Setting the mass percent of the nitrile compound to fall within the foregoing range helps to improve the cycle performance of the electrochemical device and alleviate the lithium plating of the negative electrode.

For example, the value of Y/Z may be 0.5, 1, 10, 30, 50, 80, 100, 110, 120, or any value falling within a range formed by any two thereof. Without being limited to any theory, setting the value of Y/Z to fall within the foregoing range helps to achieve synergy between the electrolyte and the negative electrode, improve the cycle performance of the electrochemical device, and alleviate the lithium plating of the negative electrode.

In some embodiments of this application, the nitrile compound includes at least one selected from the group consisting of succinonitrile, adiponitrile, 1,3,6-hexanetricarbonitrile, 1,2,3-tri(2-cyanooxy)propane, ethylene glycol bis (propionitrile) ether, and fumaronitrile. Without being limited to any theory, the use of the foregoing nitrile compound helps to improve the cycle performance of the electrochemical device and alleviate the lithium plating of the negative electrode.

In some embodiments of this application, a conductivity of the electrolyte is greater than or equal to 5.5 mS/cm. Without being limited to any theory, setting the conductivity of the electrolyte to fall within the foregoing range helps to improve the kinetic performance such as cycle performance of the electrochemical device.

In some embodiments of this application, the negative active material includes graphite and/or a silicon-based material. Without being limited to any theory, the use of the foregoing negative active material helps to achieve synergy between the negative active material and the electrolyte, thereby effectively improving the cycle performance of the electrochemical device under high voltages, and alleviating lithium plating of the negative electrode.

In some embodiments of this application, the negative active material includes a silicon-based material, and carbon and/or $Me_xO_y$ exists on a surface of the silicon-based material, where Me includes at least one selected from the group consisting of Al, Si, Mn, V, Cr, Co, and Zr, $1 \le x \le 2$, and $1 \le y \le 3$. Without being limited to any theory, the carbon or $Me_xO_y$ existent on the surface of the silicon-based material can effectively alleviate expansion of the silicon-based material during cycles, suppress side reactions between the silicon-based material and the electrolyte, and improve the conductivity of the silicon-based material, thereby further improving the cycle performance of the electrochemical device, such as the capacity retention rate of the electrochemical device subjected to cycling.

In some embodiments of this application, the electrochemical device further includes a separator. An air permeability of the separator is 50 s/100 $cm^3$ to 700 s/100 $cm^3$. For example, the air permeability of the separator is 50 s/100 $cm^3$, 100 s/100 $cm^3$, 200 s/100 $cm^3$, 300 s/100 $cm^3$, 400 s/100 $cm^3$, 500 s/100 $cm^3$, 600 s/100 $cm^3$, 700 s/100 $cm^3$, or any value falling within a range formed by any two thereof. Without being limited to any theory, setting the air permeability of the separator to fall within the foregoing range helps to improve the cycle performance of the electrochemical device.

In some embodiments of this application, the thickness of the separator is 5 μm to 30 μm. For example, the thickness of the separator is 5 μm, 10 μm, 15 μm, 20 μm, 25 μm, 30 μm, or any value falling within a range formed by any two thereof. Without being limited to any theory, when the thickness of the separator is deficient (for example, less than 5 μm), the separator is prone to a micro-short-circuit phenomenon after the electrochemical device undergoes a plurality of cycles, thereby impairing the cycle performance of the electrochemical device. When the thickness of the separator is excessive (for example, greater than 30 μm), the excessive thickness is adverse to the transport of lithium ions, and impairs the rate performance of the electrochemical device. Setting the thickness of the separator to fall within the foregoing range helps to improve the cycle performance and rate performance of the electrochemical device. In this application, a micro-short-circuit means a phenomenon of a micro short circuit occurring inside the electrochemical device.

In some embodiments of this application, a pore size of the separator is greater than 0.005 μm and less than or equal to 1 μm. For example, the pore size of the separator is 0.008 μm, 0.01 μm, 0.05 μm, 0.1 μm, 0.2 μm, 0.4 μm, 0.5 μm, 0.8 μm, 1 μm, or any value falling within a range formed by any two thereof. Without being limited to any theory, a deficient pore size (for example, less than 0.005 μm) is adverse to the transport of lithium ions, and impairs the rate performance of the electrochemical device. With the increase of the pore size of the separator, the cycle performance of the electrochemical device is improved, and the lithium plating of the negative electrode is alleviated. When the pore size of the separator is excessive (for example, larger than 1 μm), the thermal stability of the separator decreases, and the separator is prone to deform under a high temperature, thereby drastically deteriorating the cycle performance of the electrochemical device. Setting the pore size of the separator to fall within the foregoing range helps to improve the cycle performance and rate performance of the electrochemical device.

In some embodiments of this application, at least one surface of the separator is covered with a coating. The coating includes inorganic particles. The inorganic particles include at least one selected from the group consisting of aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide, and barium sulfate. That at least one surface of the separator is covered with a coating may be: one surface of the separator is covered with a coating, or, both surfaces of the separator are covered with a coating. Without being limited to any theory, the separator covered with the coating that contains the inorganic particles falling within the foregoing range helps to improve the cycle performance of the electrochemical device. The thickness of the coating is not particularly limited in this application, as long as the objectives of this application can be achieved. For example, the thickness of the coating is 0.5 μm to 5 μm. Specifically, the thickness of the coating may be 0.5 μm, 1 μm, 2 μm, 3 μm, 4 μm, 5 μm, or any value falling within a range formed by any two thereof.

In some embodiments of this application, a charge cut-off voltage of the electrochemical device is 4.2 V to 5 V. In this application, the charge cut-off voltage means a voltage of the battery that reaches a fully charged state in a process of charging the battery at a specified constant current.

In this application, the negative electrode plate may further include a negative current collector. The negative current collector is not particularly limited in this application, as long as the objectives of this application can be achieved. For example, the negative current collector may include, but without being limited to, a copper foil, a copper alloy foil, a nickel foil, a stainless steel foil, a titanium foil, foamed nickel, foamed copper, or a composite current collector, or the like. In this application, the thickness of the negative current collector is not particularly limited, as long as the objectives of this application can be achieved. For example, the thickness is 4 μm to 12 μm.

In this application, the negative electrode plate may further include a negative material layer. The negative material layer includes the foregoing negative active material. The negative material layer may further include a conductive agent. The conductive agent is not particularly limited in this application, as long as the objectives of this application can be achieved. For example, the conductive agent may include, but without being limited to, at least one selected from the group consisting of conductive carbon black (Super P), carbon nanotubes (CNTs), carbon fibers, flake graphite, Ketjen black, graphene, a metal material, and a conductive polymer. The carbon nanotubes may include, but without being limited to, single-walled carbon nanotubes and/or multi-walled carbon nanotubes. The carbon fibers may include, but without being limited to, vapor grown carbon fibers (VGCF) and/or carbon nanofibers. The metal material may include, but without being limited to, metal powder and/or metal fibers. Specifically, the metal may include, but without being limited to at least one selected from the group consisting of copper, nickel, aluminum, and silver. The conductive polymer may include, but without being limited to, at least one selected from the group consisting of polyphenylene derivatives, polyaniline, polythiophene, polyacetylene, and polypyrrole.

In this application, the negative material layer may further include a binder. The binder is not particularly limited in this application, as long as the objectives of this application can be achieved. For example, the binder may include, but without being limited to, at least one selected from the group consisting of polyacrylic acid, polyacrylic acid sodium, polyacrylic acid potassium, polyacrylic acid lithium, polyimide, polyvinyl alcohol, carboxymethyl cellulose, sodium carboxymethyl cellulose, polyimide, polyamide imide, styrene butadiene rubber, and polyvinylidene fluoride.

Optionally, the negative electrode plate may further include a conductive layer. The conductive layer is located between the negative current collector and the negative material layer. The components of the conductive layer are not particularly limited in this application, and may be a conductive layer commonly used in the art. For example, the conductive layer may include, but without being limited to, the foregoing conductive agent and binder.

The electrochemical device according to this application may further include a positive electrode plate. The positive electrode plate is not particularly limited in this application, as long as the objectives of this application can be achieved. For example, the positive electrode plate generally includes a positive current collector and a positive material layer. In this application, the positive current collector is not particularly limited, as long as the objectives of this application can be achieved. For example, the positive current collector may include, but without being limited to, an aluminum foil, an aluminum alloy foil, a composite current collector, or the like. In this application, the thickness of the positive current collector is not particularly limited, as long as the objectives of this application can be achieved. For example, the thickness is 8 μm to 12 μm.

In this application, the positive material layer includes a positive active material. The positive active material is not particularly limited, as long as the objectives of this application can be achieved. For example, the positive active material may include at least one selected from the group consisting of lithium or a composite oxide of a transition metal element. The transition metal element is not particularly limited in this application, as long as the objectives of this application can be achieved. For example, the transition metal element may include at least one selected from the group consisting of nickel, manganese, cobalt, and iron. Specifically, the positive active material may include at least one selected from the group consisting of lithium nickel cobalt manganese oxide (811, 622, 523, 111), lithium nickel cobalt aluminum oxide, lithium iron phosphate, a lithium-rich manganese-based material, lithium cobalt oxide, lithium manganese oxide, lithium manganese iron phosphate, and lithium titanium oxide.

In this application, the positive material layer may further include a conductive agent. The conductive agent is not particularly limited in this application, as long as the objectives of this application can be achieved. For example, the conductive agent may include, but without being limited to, at least one selected from the group consisting of the foregoing conductive agents.

In this application, the positive material layer may further include a binder. The binder is not particularly limited in this application, as long as the objectives of this application can be achieved. For example, the binder may include, but without being limited to, at least one selected from the group consisting of the foregoing binders.

Optionally, the positive electrode plate may further include a conductive layer. The conductive layer is located between the positive current collector and the positive material layer. The components of the conductive layer are not particularly limited in this application, and may be a conductive layer commonly used in the art. The conductive layer may include, but without being limited to, the foregoing conductive agent and binder.

The type of the separator is not particularly limited in this application, as long as the objectives of this application can be achieved. For example, the type of the separator may include, but without being limited to, at least one selected from the group consisting of polyethylene (PE)-based, polypropylene (PP)-based, or polytetrafluoroethylene-based polyolefin (PO) separator, a polyester film (such as polyethylene terephthalate (PET) film), a cellulose film, a polyimide film (PI), a polyamide film (PA), a spandex or aramid film, a woven film, a non-woven film (non-woven fabric), a microporous film, a composite film, separator paper, a laminated film, and a spinning film.

The coating of the separator in this application may further include a coating binder. The coating binder is not particularly limited in this application, and may include, but without being limited to, at least one selected from the group consisting of polyvinylidene difluoride, poly(vinylidene difluoride-co-hexafluoropropylene), polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, and polyhexafluoropropylene.

In this application, the coating of the separator may further include a polymer. The material of the polymer may include, but without being limited to, at least one selected from the group consisting of polypropylene, polyamide, polyacrylonitrile, acrylate polymer, polyacrylic acid, polyacrylate, polyvinylpyrrolidone, polyvinyl ether, polyvinylidene difluoride, poly(vinylidene difluoride-co-hexafluoropropylene), and the like.

In this application, the electrolyte may further include a lithium salt. The lithium salt is not particularly limited in this application, as long as the objectives of this application can be achieved. For example, the lithium salt may include, but without being limited to, at least one selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. Preferably, the lithium salt includes $LiPF_6$.

The electrochemical device in this application is not particularly limited, and may be any device in which an electrochemical reaction occurs. In some implementation solutions, the electrochemical device may include, but is not limited to, a lithium metal secondary battery, a lithium-ion secondary battery (lithium-ion battery), a lithium polymer secondary battery, a lithium-ion polymer secondary battery, or the like.

The process of preparing the electrochemical device is well known to a person skilled in the art, and is not particularly limited in this application. For example, the preparation process may include, but without being limited to, the following steps: stacking the positive electrode plate, the separator, and the negative electrode plate in sequence, and performing operations such as winding and folding as required to obtain a jelly-roll electrode assembly; putting the electrode assembly into a package, injecting the electrolyte into the package, and sealing the package to obtain an electrochemical device; or, stacking the positive electrode plate, the separator, and the negative electrode plate in sequence, and then fixing the four corners of the entire stacked structure by use of adhesive tape to obtain a stacked-type electrode assembly, putting the electrode assembly into a package, injecting the electrolyte into the package, and sealing the package to obtain an electrochemical device. In addition, an overcurrent prevention element, a guide plate, and the like may be placed into the package as required, so as to prevent the rise of internal pressure, overcharge, and overdischarge of the electrochemical device.

A second aspect of this application provides an electronic device. The electronic device includes the electrochemical device according to any one of the foregoing implementation solutions. The electronic device achieves a relatively long service life under high voltages.

The electronic device according to this application is not particularly limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game console, a watch, an electric tool, a flashlight, a camera, a large household battery, a lithium-ion capacitor, and the like.

This application provides an electrochemical device. The electrochemical device includes a negative electrode plate and an electrolyte. The negative electrode plate includes a negative active material. A specific surface area of the negative active material is A $m^2/g$ and $0.3 \le A \le 4$. The electrolyte includes fluorocarboxylate and fluorocarbonate. Based on a mass of the electrolyte, a mass percent of the fluorocarboxylate is X % and a mass percent of the fluorocarbonate is Y %, $5 \le Y \le 70$, and the electrochemical device satisfies $50 \le X+Y \le 85$, and $6 \le Y/A \le 200$. The synergy between the negative active material and the electrolyte can effectively improve cycle performance of the electrochemical device under high voltages, and alleviate lithium plating of the negative electrode.

DETAILED DESCRIPTION OF EMBODIMENTS

To make the objectives, technical solutions, and advantages of this application clearer, the following describes this application in more detail with reference to embodiments. Evidently, the described embodiments are merely a part of but not all of the embodiments of this application. All other embodiments derived by a person of ordinary skill in the art based on the embodiments of this application without making any creative efforts fall within the protection scope of this application.

It needs to be noted that in specific embodiments of this application, this application is construed by using a lithium-ion battery as an example of the electrochemical device, but the electrochemical device according to this application is not limited to the lithium-ion battery.

Embodiments

The implementations of this application are described below in more detail with reference to embodiments and comparative embodiments. Various tests and evaluations are performed in accordance with the following methods.

Test Methods and Devices:

Evaluation of the Cycle Performance:

Putting the lithium-ion battery into a 45° C. thermostat, and leaving the battery to stand for 30 minutes so that the temperature of the lithium-ion battery is constant. Charging, after the lithium-ion battery reaches a constant temperature, the lithium-ion battery at a constant current of 1 C at 45° C. until the voltage reaches 4.45 V, and then charging the battery at a constant voltage of 4.45 V until the current reaches 0.025 C. Leaving the battery to stand for 30 minutes, and then discharging the battery at a constant current of 1 C until the voltage reaches 3.0 V, thereby completing a charge-and-discharge cycle. Repeating the foregoing charge-and-discharge process, and calculating the capacity retention rate of the battery at the end of 500 cycles.

Calculating the capacity retention rate of the cycled lithium-ion battery by the following formula:

$$\text{Capacity retention rate} = (500^{th}\text{−cycle discharge capacity/first−cycle discharge capacity}) \times 100\%.$$

Method for Determining a Lithium Plating Phenomenon of the Lithium-Ion Battery:

Putting the lithium-ion battery into a 0° C. thermostat, and leaving the battery to stand for 60 minutes so that the temperature of the lithium-ion battery is constant. Charging, after the lithium-ion battery reaches a constant temperature, the lithium-ion battery at a constant current of 1 C at 0° C. until the voltage reaches 4.45 V, and then charging the battery at a constant voltage of 4.45 V until the current reaches 0.025 C. Leaving the battery to stand for 5 minutes, and then discharging the battery at a constant current of 1 C until the voltage reaches 3.0 V, thereby completing a charge-and-discharge cycle. Subsequently, charging the lithium-ion battery at a constant current of 1 C until the voltage reaches 4.45 V, and then charging the battery at a constant voltage of 4.45 V until the current reaches 0.025 C, so as to obtain a fully charged battery cycled for 10 cycles. Disassembling the battery in a drying room with a humidity less than 5%, and taking photos to record the status of the negative electrode plate.

Determining severity of lithium plating of the lithium-ion battery according to the following criteria:

No lithium plating: No lithium is deposited on the surface of the negative electrode plate;

Slight lithium plating: The lithium deposition area on the surface of the negative electrode plate is less than 10%;

Moderate lithium plating: The lithium deposition area on the surface of the negative electrode plate is 10% to 30%; and Severe lithium plating: The lithium deposition area on the surface of the negative electrode plate is greater than 30%.

Measurement of the Air Permeability:

Measuring the air permeability of a separator of a disassembled battery with an air permeameter, where the air column volume of the air permeameter is 100 $cm^3$, and the test area of the separator is 6.45 $cm^2$. Keeping the separator absolutely flat during the test. Repeating the test for 3 times, and averaging out the measured values to obtain a final air permeability value.

Measurement of the Conductivity of the Electrolyte:

Putting 50 ml of electrolyte of a disassembled battery into a 100 ml beaker, and leaving the beaker to stand in a 25° C. water bath for 30 minutes. Subsequently, measuring the conductivity of the electrolyte at 25° C. by using a conductivity meter (model DDS-307, manufactured by Shanghai Leici). Repeating the test for 3 times, and averaging out the measured values to obtain a conductivity value of the electrolyte.

Embodiment 1

<Preparing a Positive Electrode Plate>

Mixing lithium cobalt oxide ($LiCoO_2$) as a positive active material, conductive carbon black (Super P) as a conductive agent, and polyvinylidene difluoride as a binder at a mass ratio of 96:2:2, adding N-methyl-pyrrolidone (NMP), and mixing well with a vacuum mixer to obtain a positive slurry, in which the solid content is 70 wt %. Coating one surface of a 12-μm-thick positive current collector aluminum foil with the positive slurry evenly, and drying the aluminum foil at 120° C. for 1 hour to obtain a positive electrode plate coated with a 110-μm-thick positive material layer on a single side. Repeating the foregoing steps on the other surface of the aluminum foil to obtain a positive electrode plate coated with the positive active material on both sides. Subsequently, performing cold calendering, cutting, and slitting, and drying under vacuum conditions at 120° C. for 1 hour to obtain a positive electrode plate of 74 mm×867 mm in size.

<Preparing a Negative Electrode Plate>

Mixing silicon-based material SiO particles and graphite at a mass ratio of 15:85 to obtain a negative active material. Mixing the negative active material, a conductive agent Super P, a thickener sodium carboxymethyl cellulose (CMC), and a binder styrene butadiene rubber (SBR) at a mass ratio of 85:2:13. Adding deionized water, and mixing well with a vacuum mixer to obtain a negative slurry, in which the solid content is 75 wt %. Coating one surface of a 12-μm-thick negative current collector copper foil with the negative slurry evenly, and drying the copper foil at 120° C. to obtain a negative electrode plate coated with a 130-μm-thick negative material layer on a single side. Repeating the foregoing steps on the other surface of the copper foil to obtain a negative electrode plate coated with the negative active material on both sides. Subsequently, performing cold calendering, cutting, and slitting, and drying under vacuum conditions at 120° C. for 1 hour to obtain a negative electrode plate of 74 mm×867 mm in size. The specific surface area of the negative active material is 0.5 $m^2/g$. The silicon-based particles are obtained by mixing Si and $SiO_2$ at a molar ratio of 1:1.

<Preparing an Electrolyte>

Mixing fluorocarboxylate, difluoroethyl acetate, fluorocarbonate, fluoroethylene carbonate (FEC), and diethyl carbonate in a dry argon atmosphere glovebox to obtain a basic organic solvent, and then adding lithium hexafluorophosphate ($LiPF_6$) into the basic organic solvent to dissolve, and mixing well to obtain an electrolyte. Based on the massy of the electrolyte, the mass percent of difluoroethyl acetate is 20 wt %, the mass percent of fluoroethylene carbonate is 30 wt %, the mass percent of $LiPF_6$ is 12.5 wt %, and the remainder is diethyl carbonate.

<Preparing a Separator>

Using a 30-μm-thick polypropylene film as a separator, of which the pore size is 0.008 μm and the air permeability is 650 s/100 $cm^3$.

<Preparing a Lithium-Ion Battery>

Stacking the prepared positive electrode plate, the separator, and the negative electrode plate sequentially in such a way that the separator is located between the positive electrode plate and the negative electrode plate to serve a function of separation, and winding the stacked structure to obtain an electrode assembly. Putting the electrode assembly into an aluminum plastic film package, drying the packaged electrode assembly, and then injecting the electrolyte. Performing vacuum sealing, static standing, chemical formation, degassing, and edge trimming to obtain a lithium-ion battery. The conditions of chemical formation are: charging the battery at a constant current of 0.02 C until the voltage reaches 3.3 V, and then charging the battery at a constant current of 0.1 C until the voltage reaches 3.6 V.

Table 1 shows parameters and evaluation results of Embodiments 1 to 18 and Comparative Embodiments 1 to 6.

Embodiments 1 to 16 and Comparative Embodiments 1 to 5 make changes on the basis of Embodiment 1 according to the parameters in the table. Embodiment 17 is identical to Embodiment 2 except the following steps: depositing $Al_2O_3$ on the surface of the silicon-based particles by using an atomic layer deposition (ALD) technique, and then mixing the silicon-based particles containing $Al_2O_3$ on the surface with graphite to obtain a negative active material, where the deposition thickness of $Al_2O_3$ on the surface of silicon-based particles is 35 nm. Embodiment 18 is identical to Embodiment 2 except the following steps: depositing amorphous carbon on the surface of the silicon-based particles by using an atomic layer deposition (ALD) technique, and then mixing the silicon-based particles containing amorphous carbon on the surface with graphite to obtain a negative active material, where the thickness of amorphous carbon on the surface of silicon-based particles is 35 nm.

TABLE 1

| | Fluorocarboxylate | | Fluorocarbonate | | | | | | | |
|---|---|---|---|---|---|---|---|---|---|---|
| | Type | Content X (%) | Type | Content Y (%) | X + Y (%) | Specific surface area of negative active material A ($m^2/g$) | Y/A | Capacity retention rate (%) | Lithium deposition test | Conductivity of electrolyte (mS/cm) |
| Embodiment 1 | Difluoroethyl acetate | 20 | FEC | 30 | 50 | 0.5 | 60 | 50 | No lithium plating | 6.7 |
| Embodiment 2 | Difluoroethyl acetate | 30 | FEC | 35 | 65 | 0.5 | 70 | 52 | No lithium plating | 6.8 |
| Embodiment 3 | Difluoroethyl acetate | 40 | FEC | 35 | 75 | 0.5 | 70 | 58 | No lithium plating | 7 |
| Embodiment 4 | Difluoroethyl acetate | 15 | FEC | 70 | 85 | 0.5 | 140 | 61 | No lithium plating | 5.6 |
| Embodiment 5 | Difluoroethyl acetate | 50 | FEC | 5 | 55 | 0.5 | 10 | 61 | No lithium plating | 6.1 |
| Embodiment 6 | Difluoroethyl acetate | 25 | FEC | 60 | 85 | 0.3 | 200 | 62 | No lithium plating | 5.7 |
| Embodiment 7 | Difluoroethyl acetate + monofluoroethyl acetate | 30 + 10 | FEC | 25 | 65 | 0.5 | 50 | 65 | No lithium plating | 6.8 |
| Embodiment 8 | Difluoroethyl acetate + ethyl trifluoroacetate | 20 + 20 | FEC | 25 | 65 | 0.5 | 50 | 63 | No lithium plating | 6.2 |
| Embodiment 9 | Ethyl trifluoroacetate | 40 | FEC | 25 | 65 | 0.5 | 50 | 61 | No lithium plating | 5.7 |

TABLE 1-continued

| | Fluorocarboxylate | | Fluorocarbonate | | | Specific surface area of negative active | | Capacity | Lithium | Conductivity of |
|---|---|---|---|---|---|---|---|---|---|---|
| | Type | Content X (%) | Type | Content Y (%) | X + Y (%) | material A ($m^2/g$) | Y/A | retention rate (%) | deposition test | electrolyte (mS/cm) |
| Embodiment 10 | Difluoroethyl acetate | 40 | DFEC + FEC | 10 + 20 | 70 | 0.5 | 60 | 65 | Slight lithium plating | 6.3 |
| Embodiment 11 | Difluoroethyl acetate | 30 | FEC + bis(2,2,2-trifluoroethyl) carbonate | 20 + 15 | 65 | 0.5 | 70 | 63 | No lithium plating | 6.7 |
| Embodiment 12 | Difluoroethyl acetate + ethyl trifluoroacetate | 30 + 30 | DFEC + methyl trifluoroethyl carbonate | 10 + 15 | 85 | 0.5 | 50 | 65 | Slight lithium plating | 6.5 |
| Embodiment 13 | Difluoroethyl acetate | 30 | FEC | 35 | 65 | 0.3 | 116.67 | 50 | Slight lithium plating | 6.8 |
| Embodiment 14 | Difluoroethyl acetate | 30 | FEC | 35 | 65 | 1 | 35 | 55 | No lithium plating | 6.8 |
| Embodiment 15 | Difluoroethyl acetate | 30 | FEC | 35 | 65 | 2 | 17.50 | 59 | No lithium plating | 6.8 |
| Embodiment 16 | Difluoroethyl acetate | 30 | FEC | 35 | 65 | 4 | 8.75 | 51 | Slight lithium plating | 6.8 |
| Embodiment 17 | Difluoroethyl acetate | 30 | FEC | 35 | 65 | 0.5 | 70 | 60 | Slight lithium plating | 6.8 |
| Embodiment 18 | Difluoroethyl acetate | 30 | FEC | 35 | 65 | 0.5 | 70 | 65 | Slight lithium plating | 6.8 |
| Comparative Embodiment 1 | Difluoroethyl acetate | 35 | FEC | 25 | 60 | 0.1 | 250 | 40 | Moderate lithium plating | 6.4 |
| Comparative Embodiment 2 | Difluoroethyl acetate | 35 | FEC | 25 | 60 | 6 | 4.17 | 41 | Slight lithium plating | 6.4 |
| Comparative Embodiment 3 | Difluoroethyl acetate | 20 | FEC | 20 | 40 | 0.5 | 40 | 47 | Severe lithium plating | 6 |
| Comparative Embodiment 4 | Difluoroethyl acetate | 80 | FEC | 3.5 | 83.5 | 0.5 | 7 | 41 | Moderate lithium plating | 5.7 |
| Comparative Embodiment 5 | Difluoroethyl acetate | 5 | FEC | 80 | 85 | 0.5 | 170 | 35 | Severe lithium plating | 5.6 |

Note:
"/" in Table 1 indicates nonexistence of the corresponding preparation parameter or substance.

Referring to Table 1, as can be seen from Embodiments 1 to 16 and Comparative Embodiments 1 to 5, when the mass percent Y of fluorocarbonate, the total mass percent (X+Y) of the fluorocarboxylate and fluorocarbonate, the specific surface area A of the negative active material, and the Y/A ratio fall within the range specified herein, the capacity retention rate of the electrochemical device can be increased without greatly affecting the conductivity of the electrolyte.

As can be seen from Embodiments 1 to 16 and Comparative Embodiments 1 and 2, when the specific surface area A of the negative active material and the Y/A ratio fall within the range specified herein, the capacity retention rate of the electrochemical device is increased significantly.

As can be seen from Embodiments 1 to 16 and Comparative Embodiment 3, when the total mass percent (X+Y) of the fluorocarboxylate and fluorocarbonate falls within the range specified herein, the capacity retention rate of the electrochemical device is increased significantly, and the lithium plating of the negative electrode plate is alleviated significantly.

As can be seen from Embodiments 1 to 16 and Comparative Embodiments 4 and 5, when the mass percent Y of the fluorocarbonate falls within the range specified herein, the capacity retention rate of the electrochemical device can be increased, and the lithium plating of the negative electrode can be alleviated.

As can be seen from Embodiments 2, 17, and 18, when the negative electrode includes silicon-based particles and the surface of the silicon-based particles contains the material provided in this application, the capacity retention rate of the electrochemical device can be further increased.

Table 2 shows parameters and evaluation results of Embodiments 2 and 5 and Embodiments 19 to 29.

In Embodiments 19 to 29, on the basis of Embodiment 2, the content of fluorocarboxylate and the content of fluorocarbonate are adjusted according to the parameters in Table 2, and nitrile compounds are further added according to the types and content shown in Table 2.

TABLE 2

| | X (%) | Y (%) | Nitrile compound Type | Nitrile compound Content Z (%) | Y/Z | Conductivity of electrolyte (mS/cm) | Capacity retention rate (%) | Lithium deposition test |
|---|---|---|---|---|---|---|---|---|
| Embodiment 2 | 30 | 35 | / | / | / | 6.8 | 52 | No lithium plating |
| Embodiment 5 | 50 | 5 | / | / | / | 6.1 | 61 | No lithium plating |
| Embodiment 19 | 30 | 35 | Succinonitrile | 0.3 | 116.7 | 6.7 | 57 | No lithium plating |
| Embodiment 20 | 30 | 35 | Succinonitrile | 1 | 35 | 6.3 | 61 | No lithium plating |
| Embodiment 21 | 30 | 35 | Succinonitrile | 4 | 8.75 | 6.0 | 69 | No lithium plating |
| Embodiment 22 | 30 | 35 | Succinonitrile | 10 | 3.5 | 5.6 | 63 | Slight lithium plating |
| Embodiment 23 | 30 | 35 | Succinonitrile + adiponitrile | 2 + 2 | 8.75 | 6.0 | 69 | No lithium plating |
| Embodiment 24 | 30 | 35 | Succinonitrile + 1,3,6-hexanetricarbonitrile | 3 + 1 | 8.75 | 6.0 | 68 | No lithium plating |
| Embodiment 25 | 30 | 35 | 1,3,6-hexanetricarbonitrile + 1,2,3-tris (2-cyano-oxy)propane | 2 + 2 | 8.75 | 6.1 | 67 | No lithium plating |
| Embodiment 26 | 30 | 35 | Succinonitrile + 1,3,6-hexanetricarbonitrile + 1,2,3-tris (2-cyano-oxy)propane | 2 + 2 + 1 | 7 | 5.9 | 70 | No lithium plating |
| Embodiment 27 | 50 | 5 | Succinonitrile | 10 | 0.5 | 5.5 | 62 | Slight lithium plating |
| Embodiment 28 | 30 | 35 | Succinonitrile | 0.2 | 175 | 6.8 | 51 | No lithium plating |
| Embodiment 29 | 50 | 5 | Succinonitrile | 16.7 | 0.3 | 4.4 | 53 | Moderate lithium plating |

Note:
"/" in Table 2 indicates nonexistence of the corresponding preparation parameter or substance.

Referring to Table 2, as can be seen from Embodiment 2 and Embodiments 19 to 26, the nitrile compound added in the electrolyte can further increase the capacity retention rate of the electrochemical device.

As can be seen from Embodiments 19 to 29, when the value of Y/Z falls within the range specified herein, the lithium plating of the negative electrode plate can be alleviated on the basis of improving the capacity retention rate of the electrochemical device. As can be seen from Embodiments 19 to 27 and Comparative Embodiment 29, when the mass percent Z of the nitrile compound falls within the range specified herein, the capacity retention rate of the electrochemical device can be increased, and the lithium plating of the negative electrode can be alleviated.

As can be seen from Embodiments 19 to 22, when the total mass percent (X+Y) of fluorocarbonate and fluorocarboxylate in the electrolyte remains unchanged, the mass percent Z of the nitrile compound is excessively high or the Y/Z ratio is excessively low, the conductivity of the electrolyte shows a tendency to decrease gradually, the capacity retention rate of the electrochemical device cannot be further improved, and slight lithium plating occurs on the negative electrode plate.

Table 3 shows parameters and evaluation results of Embodiment 3 and Embodiments 30 to 37.

Embodiments 30 to 37 make changes on the basis of Embodiment 3 according to the parameters in the table. Embodiment 37 is identical to Embodiment 34 except the following steps: mixing $Al_2O_3$, water, and polyvinyl alcohol at a mass ratio of 10:30:1 to obtain a coating slurry, and then coating one surface of the separator with the coating slurry by a thickness of 2 and drying the separator at 120° C. Repeating the foregoing steps on the other surface of the separator to obtain a separator coated on both sides.

TABLE 3

| | Pore size of separator (μm) | Thickness of separator (μm) | Air permeability of separator (s/100 cm$^3$) | Capacity retention rate (%) | Lithium deposition test |
|---|---|---|---|---|---|
| Embodiment 3 | 0.008 | 30 | 650 | 58 | No lithium plating |
| Embodiment 30 | 0.005 | 30 | 710 | 50 | No lithium plating |
| Embodiment 31 | 0.008 | 28 | 690 | 57 | No lithium plating |
| Embodiment 32 | 0.008 | 25 | 500 | 60 | No lithium plating |
| Embodiment 33 | 0.01 | 25 | 351 | 61 | No lithium plating |
| Embodiment 34 | 0.1 | 10 | 60 | 65 | No lithium plating |
| Embodiment 35 | 0.8 | 35 | 48 | 51 | No lithium plating |
| Embodiment 36 | 1.1 | 4 | 45 | 50 | No lithium plating |
| Embodiment 37 | 0.1 | 10 | 65 | 69 | No lithium plating |

Note:
"/" in Table 3 indicates nonexistence of the corresponding preparation parameter or substance.

The thickness, pore size, and air permeability of the separator usually also affect the comprehensive performance such as capacity retention rate of the electrochemical device. Referring to Table 3, when the thickness, pore size, and air permeability of the separator are set to fall within the ranges specified herein, all the resulting electrochemical devices achieve a high capacity retention rate.

The coating disposed on the surface of the separator usually also affects the comprehensive performance such as capacity retention rate of the electrochemical device. As can be seen from Embodiments 34 and 37, when the coating includes the inorganic particles provided in this application, the capacity retention rate of the electrochemical device can be further increased.

What is described above is merely preferred embodiments of this application, but is not intended to limit this application. Any modifications, equivalent substitutions, and improvements made within the spirit and principles of this application still fall within the protection scope of this application.

What is claimed is:

1. An electrochemical device, comprising a negative electrode plate and an electrolyte; wherein the negative electrode plate comprises a negative active material, a specific surface area of the negative active material is A m$^2$/g and $0.3 \leq A \leq 4$; the electrolyte comprises fluorocarboxylate and fluorocarbonate; and, based on a mass of the electrolyte, a mass percent of the fluorocarboxylate is X % and a mass percent of the fluorocarbonate is Y %, $5 \leq Y \leq 70$, and $55 \leq X+Y \leq 85$, and $6 \leq Y/A \leq 200$.

2. The electrochemical device according to claim 1, wherein the fluorocarboxylate comprises at least one selected from the group consisting of ethyl difluoroacetate, difluoroethyl acetate, ethyl monofluoroacetate, monofluoroethyl acetate, ethyl trifluoroacetate, and trifluoroethyl acetate.

3. The electrochemical device according to claim 1, wherein a number of carbon atoms in the fluorocarbonate is less than or equal to 7, and the fluorocarbonate comprises cyclic fluorocarbonate and/or chain fluorocarbonate.

4. The electrochemical device according to claim 1, wherein the fluorocarbonate comprises fluoroethylene carbonate and/or difluoroethylene carbonate.

5. The electrochemical device according to claim 1, wherein the fluorocarbonate comprises at least one selected from the group consisting of bis(2,2,2-trifluoroethyl)carbonate, bis(2,2-difluoroethyl)carbonate, methyl trifluoroethyl carbonate, methyl difluoroethyl carbonate, and methyl-fluoroethyl carbonate.

6. The electrochemical device according to claim 1, wherein the electrolyte further comprises a nitrile compound, a number of cyano groups in the nitrile compound is 1 to 6, and, based on the mass of the electrolyte, a mass percent of the nitrile compound is Z %, wherein $0.1 \leq Z \leq 10$ and $0.5 \leq Y/Z \leq 120$.

7. The electrochemical device according to claim 6, wherein $0.3 \leq Z \leq 8$ and $5 \leq Y/Z \leq 120$.

8. The electrochemical device according to claim 6, wherein the nitrile compound comprises at least one selected from the group consisting of succinonitrile, adiponitrile, 1,3,6-hexanetricarbonitrile, 1,2,3-tri(2-cyanooxy)propane, ethylene glycol bis(propionitrile) ether, and fumaronitrile.

9. The electrochemical device according to claim 1, wherein a conductivity of the electrolyte is greater than or equal to 5.5 mS/cm.

10. The electrochemical device according to claim 1, wherein the negative active material comprises graphite and/or a silicon-based material.

11. The electrochemical device according to claim 1, wherein the negative active material comprises a silicon-based material; and carbon or $Me_xO_y$ exists on a surface of the silicon-based material, wherein Me comprises at least one selected from the group consisting of Al, Si, Mn, V, Cr, Co, and Zr, $1 \leq x \leq 2$, and $1 \leq y \leq 3$.

12. The electrochemical device according to claim 1, wherein the electrochemical device further comprises a separator, and the separator satisfies at least one of the following conditions (a) to (c):

(a) an air permeability of the separator is 50 s/100 cm$^3$ to 700 s/100 cm$^3$;

(b) a thickness of the separator is 5 μm to 30 μm;

(c) a pore size of the separator is greater than 0.005 μm and less than or equal to 1 μm.

13. The electrochemical device according to claim 12, wherein at least one surface of the separator is covered with a coating, the coating comprises inorganic particles, and the inorganic particles comprise at least one selected from the group consisting of aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide, and barium sulfate.

14. The electrochemical device according to claim 1, wherein a charge cut-off voltage of the electrochemical device is 4.2 V to 5 V.

15. An electronic device, comprising an electrochemical device, the electrochemical device comprising a negative electrode plate and an electrolyte; wherein the negative electrode plate comprises a negative active material, a specific surface area of the negative active material is A $m^2/g$ and $0.3 \le A \le 4$; the electrolyte comprises fluorocarboxylate and fluorocarbonate; and, based on a mass of the electrolyte, a mass percent of the fluorocarboxylate is X % and a mass percent of the fluorocarbonate is Y %, $5 \le Y \le 70$, and $50 \le X+Y \le 85$, and $6 \le Y/A \le 200$.

16. The electronic device according to claim 15, wherein the fluorocarboxylate comprises at least one selected from the group consisting of ethyl difluoroacetate, difluoroethyl acetate, ethyl monofluoroacetate, monofluoroethyl acetate, ethyl trifluoroacetate, and trifluoroethyl acetate.

17. The electronic device according to claim 15, wherein the fluorocarbonate comprises at least one selected from the group consisting of bis(2,2,2-trifluoroethyl)carbonate, bis(2,2-difluoroethyl)carbonate, methyl trifluoroethyl carbonate, methyl difluoroethyl carbonate, and methyl-fluoroethyl carbonate.

18. The electronic device according to claim 15, wherein the electrolyte further comprises a nitrile compound, a number of cyano groups in the nitrile compound is 1 to 6, and, based on the mass of the electrolyte, a mass percent of the nitrile compound is Z %, wherein $0.1 \le Z \le 10$ and $0.5 \le Y/Z \le 120$;

wherein the nitrile compound comprises at least one selected from the group consisting of succinonitrile, adiponitrile, 1,3,6-hexanetricarbonitrile, 1,2,3-tri(2-cyanooxy)propane, ethylene glycol bis(propionitrile) ether, and fumaronitrile.

19. The electronic device according to claim 15, wherein a conductivity of the electrolyte is greater than or equal to 5.5 mS/cm.

20. The electronic device according to claim 15, wherein the electrochemical device further comprises a separator, and the separator satisfies at least one of the following conditions (a) to (c):

(a) an air permeability of the separator is 50 s/100 $cm^3$ to 700 s/100 $cm^3$;

(b) a thickness of the separator is 5 μm to 30 μm;

(c) a pore size of the separator is greater than 0.005 μm and less than or equal to 1 μm.

* * * * *